Patented Sept. 14, 1943

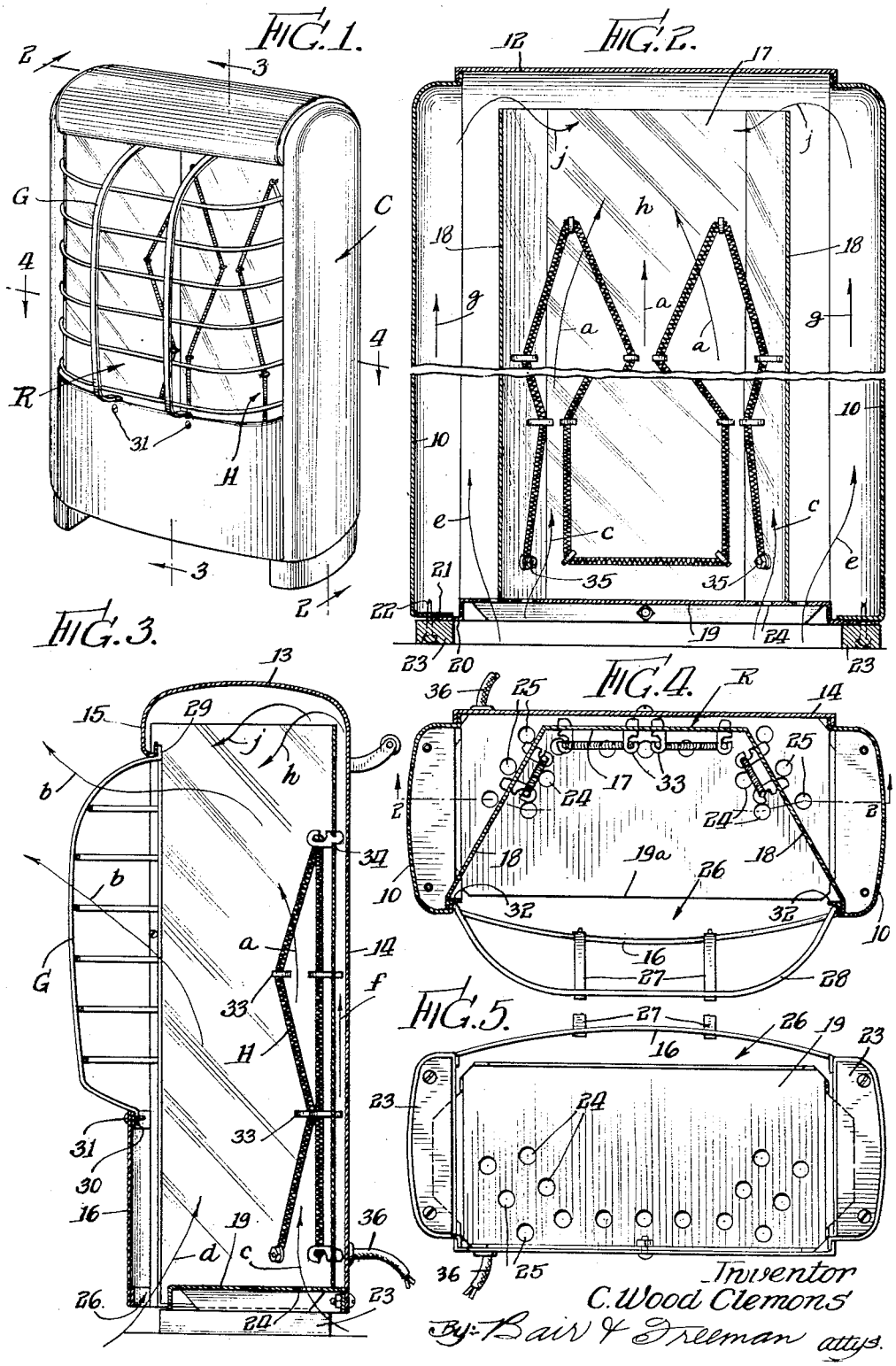

2,329,592

UNITED STATES PATENT OFFICE 2,329,592

ROOM HEATER

C. Wood Clemons, St. Louis, Mo., assignor to Knapp-Monarch Company, St. Louis, Mo., a corporation of Missouri Application November 12, 1940, Serial No. 365,311

2 Claims. (Cl. 219—34)

My present invention relates to an electric heater for rooms and/or spaces which is of general box-like construction and designed to secure maximum efficiency and thermal circulation of the air heated by the heating element of the structure.

One object of the invention is to provide a heater of the general character mentioned, which is simple durable and inexpensive to manufacture.

Another object is to provide a heater having a box-like casing and a reflector therein for the heating element so shaped and associated with the casing that efficient air circulation is assured to dissipate heat from the heating element into the room surrounding the heater and at the same time keep the casing for the heater relatively cool.

More particularly, it is my object to provide a casing with a reflector therein having walls spaced from the walls of the casing and means to permit air off the floor to enter the bottom of the casing and flow upwardly both inside the reflector for being heated by the heating element supported thereby and outside the reflector within the casing for absorbing heat from the back of the reflector and from the casing walls themselves which latter air is deflected by a top wall of the casing so as to flow outwardly into the room with the air heated by the heating element.

With these and other objects in view, my invention consists in the construction, arrangement and combination of the various parts of my device whereby the objects contemplated are attained, as hereinafter more fully set forth, pointed out in my claims and illustrated in the accompanying drawing. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawing, in which:

Figure 1 is a perspective view of a room heater embodying my invention.

Figure 2 is a vertical sectional view on the line 2—2 of Figure 1 showing the heater on an enlarged scale and portions being broken away to preserve space on the drawing.

Figure 3 is an enlarged vertical sectional view on the line 3—3 of Figure 1.

Figure 4 is an enlarged horizontal sectional view on the line 4—4 of Figure 1 and includes a section line 2—2 indicating where the section for Figure 2 is taken; and Figure 5 is a bottom plan view of my room heater.

On the accompanying drawing I have used the reference character C to indicate generally a casing, R a reflector and H a heating element. The casing C comprises side walls 10, a top wall 13 and a back wall 14. The top wall 13 has a depending front wall portion 15. The front of the casing C is open with the exception of the wall portion 15 and a lower guard wall 16.

The reflector R comprises a back wall 17 and a pair of inclined side walls 18. The back wall 17 is spaced slightly from the back wall 14 of the casing C and the forward edges of the side walls 18 terminate adjacent the front edges of the side walls 10 of the casing. Thus referring to Figure 4, there is an enclosed space in the casing between the casing walls 10 and 14 and the reflector R.

Referring to Figure 3, it will be noted, that the upper edge of the reflector R terminates below the top wall 13 and above the lower edge of the depending front wall 15 for purposes which will hereinafter appear. The casing C further has a bottom wall 19 provided with downwardly offset flanges 20 contacting with the lower surfaces of inturned flanges 21 on the lower edges of the side walls 10 of the casing C. The flanges 20 and 21 are held in contact with each other by means of screws 22 extending upwardly through foot members 23 and into the flanges 21 as shown in Figure 2. The foot members 23 may be made of wood or any suitable insulating material.

The bottom wall 19 is provided with a series of perforations 24 located inside of the reflector R as shown in Figure 4 and another series of openings 25 positioned outside of the reflector or between the reflector walls 18 and casing walls 10. The front edge of the bottom wall 19 is indicated at 19a and it will be noted that there is a space 26 between this edge and between the guard wall 16 (see Figure 4).

A protective grill G is provided for the open front of the casing C. It comprises vertical elements 27 and horizontal elements 28 made of wire or flat bars and welded or otherwise suitably secured together. The bars 27 and their upper ends at 29 hook to enter behind the lower edge of the front wall 15 and their lower ends indicated at 30 are secured as by screws 31 to the guard wall 16. The ends of the horizontal members 28 rest in rabbet-like flanges 32 formed at the forward edges of the side walls 10 of the casing.

The heating element H is supported on insulators 33. The insulators 33 are made of lavite or the like and coact with slots 34 in the reflector R. Some of the insulators are supported on the wall 17 and some of them on the walls 18 so that the heating element may be arranged in a zigzag formation on the reflector and its resiliency tends to retain the insulators 33 in position. The terminal ends of the heating elements are connected with terminal screws 35 which are suitably insulated and connected with a supply cord 36.

When the heating element H is energized, it will heat the adjacent air to cause it to rise as indicated by the arrow $a$ in Figures 2 and 3. Such air will be thrown out into the room as indicated by the arrow $b$ and cold air from the floor will be drawn in through the perforations 24 as indicated by the arrow $c$. Air will also be drawn in through the space 26 as indicated by the arrow $d$.

The reflector R will be heated and accordingly will heat the space between it and the casing walls, thus also inducing circulation of air as indicated by the arrow $e$ through the perforations 25. Some of this air will pass upwardly between the back walls 14 and 17 of the casing and reflector as indicated by the arrow $f$ and some of it will pass upwardly between the side walls 10 and 18 as indicated by the arrow $g$. Such air will cool the casing so as to keep its temperature relatively low so as to avoid burning a person touching the casing. Such air will flow over the upper edge of the reflector as indicated by the arrows $h$ and $j$ and be carried with the heated air indicated by the arrow $b$ into the room. The air circulating arrangement provides for a maximum of efficiency in the circulating operation and in the dissipation of heat from the heating element, the reflector and the casing into the room as desired.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. A room heater of the character disclosed comprising a casing having side walls, a back wall and a top wall, said top wall having a depending portion at the front, a guard wall across the lower portion of the front of said casing, a reflector within said casing having sides and a back, the front edges of said sides terminating at the front edges of the side walls of said casing and the back wall of said reflector being spaced from the back wall of said casing, insulating elements mounted on said back and side walls of said reflector, a heating element supported on said insulating elements, a protective grill for the front of said casing between the lower edge of said depending portion of the top wall of the casing and the upper edge of said guard wall, supporting feet secured to the bottom of said casing by means of screws or the like and a bottom wall for said casing retained in position between said feet and said casing by said screws, said bottom wall being spaced above the supporting surface for said heater and having perforations to permit entry of air from adjacent said surface to the casing within the reflector and to the casing outside the reflector and between it and the casing walls, said reflector terminating at its upper edge below the top wall of said casing to permit air from outside the reflector to be deflected by the top wall toward the interior of the reflector and issue through the open front of the casing with air heated by said heating element, said guard wall having its lower edge spaced above said supporting surface and from the forward edge of said bottom wall to permit entry of additional air to the interior of the reflector.

2. A room heater of the character disclosed comprising a casing having side walls, a back wall and a top wall, said top wall having a depending portion at the front, a guard wall across the lower portion of the front of said casing, a reflector within said casing having sides and a back, the front edges of said sides terminating at the front edges of the side walls of said casing and the back wall of said reflector being spaced from the back wall of said casing, insulating elements mounted on said back and side walls of said reflector, a heating element supported on said insulating elements, a protective grill for the front of said casing between the lower edge of said depending portion of the top wall of the casing and the upper edge of said guard wall, and a bottom wall for said casing spaced above the supporting surface for said heater and having perforations to permit entry of air from adjacent said surface to the casing within the reflector and to the casing outside the reflector and between it and the casing walls with the air entering closely adjacent the reflector in all instances, said reflector terminating at its upper edge below the top wall of said casing to permit air from outside the reflector to be deflected by the top wall toward the interior of the reflector and issue through the open front of the casing with air heated by said heating element and the bottom edge of said guard wall being spaced from said bottom wall to permit entry of additional air to said heating element.

C. WOOD CLEMONS.